United States Patent [19]

Kudo et al.

[11] Patent Number: 4,900,961
[45] Date of Patent: Feb. 13, 1990

[54] THRUST BEARING ARRANGEMENT FOR CAPSTAN MOTOR

[75] Inventors: Shinichi Kudo; Yoshito Hirata, both of Nagano, Japan

[73] Assignee: Kabushiki Kaisha Sankyo Seiki Seisakusho, Nagano, Japan

[21] Appl. No.: 248,746

[22] Filed: Sep. 26, 1988

[30] Foreign Application Priority Data

Sep. 25, 1987 [JP] Japan .................. 62-145349[U]

[51] Int. Cl.[4] ............................................. H02K 5/16
[52] U.S. Cl. ..................................... 310/90; 310/156; 310/157; 384/903
[58] Field of Search ............... 310/90, 89, 91.43, 156, 310/157, 67 R, 268, 254; 384/424, 903

[56] References Cited

U.S. PATENT DOCUMENTS

| | | | |
|---|---|---|---|
| 4,295,260 | 8/1981 | Punshon | 310/90 |
| 4,329,122 | 5/1982 | Owada | 310/90 |
| 4,711,590 | 12/1987 | Lakin | 310/90 |
| 4,779,165 | 10/1988 | Elsaesser | 310/156 |

FOREIGN PATENT DOCUMENTS

| | | | |
|---|---|---|---|
| 2349855 | 4/1975 | Fed. Rep. of Germany | 310/90 |
| 1613357 | 8/1978 | Fed. Rep. of Germany | 310/90 |
| 0086411 | 7/1978 | Japan | 310/90 |
| 0138358 | 9/1985 | Japan . | |

Primary Examiner—R. Skudy
Attorney, Agent, or Firm—Sughrue, Mion, Zinn, Macpeak & Seas

[57] ABSTRACT

The shaft 1 of a capstan motor is vertically supported by a pair of relatively rotatable thrust rings 21, 22 disposed between an upper bearing 8 surrounding the shaft and the outwardly projecting flange of an E-ring 20 snapped into an annular groove 1a of the shaft.

8 Claims, 1 Drawing Sheet

THRUST BEARING ARRANGEMENT FOR CAPSTAN MOTOR

BACKGROUND OF THE INVENTION

This invention relates to a capstan drive motor in which a thrust pad is provided between a locking member and a bearing on the motor shaft.

A conventional electric motor of this type is shown in FIG. 4, wherein a boss 3 to the periphery of which a rotor yoke 2 is secured is fitted on the base end of the shaft 1 of the capstan motor of a VTR or tape recorder. The rotor yoke 2 is cup-shaped, and a cylindrical rotor magnet 4 is provided on its inner wall. The rotor magnet 4 confronts the outer periphery of a stator core 6 having windings 5 wound on protruding poles thereof (not shown). The stator core 6 is fixedly mounted on a bearing holder 7 such that the central hole of the stator core is engaged with the outer wall of the bearing holder 7. Oil-impregnated metal bearings 8 are fitted in the upper and lower ends of the inner wall of the bearing holder and the shaft 1 is rotatably inserted into the holes of the bearings. A flange 7a extends from the outer wall of the bearing holder, to support a circuit board 9 including a control circuit, drive circuit, etc. The board 9 is secured to a cup-shaped housing 10 with screws 11. A thrust pad 12 is provided at the center of the housing and abuts against the base end of the shaft 1 to prevent its downward movement. An annular groove 3a is formed in the outer wall of the boss 3, and accommodates an endless belt 13 of a drive reel or the like.

In such a conventional motor construction, the thrust pad 12 and housing 10 thwart the miniaturization of the motor, and attendantly the compactness of the recorder in which the motor is installed. In the case of a capstan motor of the type wherein a reel stand is driven by the belt 13, the housing 10 must be mounted to the board 9 after the belt is reeved around the boss groove 3a, which impedes the mounting of the housing and can score or damage the belt.

SUMMARY OF THE INVENTION

These drawbacks and disadvantages are overcome in accordance with the invention by providing a pair of relatively rotatable thrust pads at an upper portion of the motor shaft, between the upper bearing and a locking member secured to the shaft, for vertically supporting the shaft and preventing its downward movement. Such an arrangement enables the elimination of the lower thrust pad and its support/mounting housing, to thereby reduce the overall size of the motor and facilitate the installation of the drive belt.

DETAILED DESCRIPTION OF THE PREFERRED EMBODIMENT

Figure 1:
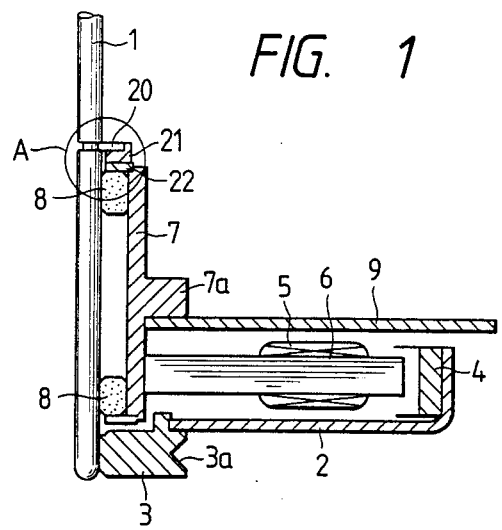
FIG. 1 is a partial sectional view of a capstan motor in accordance with the invention.
Figure 2:
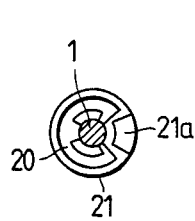
FIG. 2 is a plan view of the motor shaft and locking member of FIG. 1.
Figure 3:
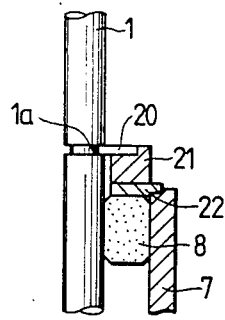
FIG. 3 is an enlarged view of the circled region A in FIG. 1.
Figure 4:
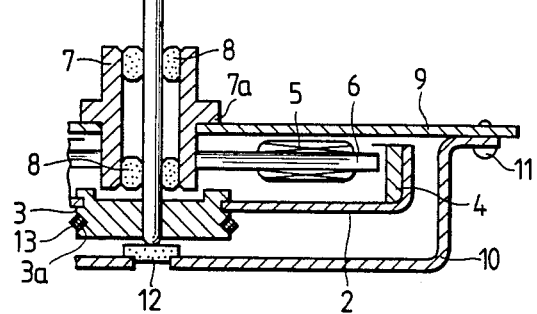
FIG. 4 is a partial sectional view of a conventional capstan motor.

Referring to FIGS. 1 through 3, in which those components previously described with reference to FIG. 4 are designated by the same reference numerals, an annular groove 1a is formed in the shaft 1 above the upper bearing 8, and an E-ring locking member 20 or circlip is engaged in such groove. A pair of thrust rings or pads 21 and 22 are disposed between the E-ring 20 and the upper end of the upper bearing 8. The upper thrust pad 21 is made of a resin such as "Nylon" or "Teflon" having a low coefficient of friction and good wearability, or it is made of metal and coated with such resin. As shown in FIGS. 2 and 3, a projection 21a extends upwardly from the upper end face of the thrust pad 21, and is disposed in the end gap or opening of the E-ring 20 so that the thrust pad 21 rotates together with the E-ring and the shaft 1. The lower thrust pad 22 is made of the same material as the upper thrust pad 21, and abuts against the upper end of the upper bearing 8. Its outer periphery is disposed in an annular groove in the inner edge of the upper end of the bearing holder 7. As the pair of thrust pads 21 and 22 are disposed between the rotatable E-ring 20 and the fixed upper bearing 8, the two thrust pads are slidably and/or rotatably abutted against each other, and the downward movement of the shaft 1 is prevented.

In the described embodiment an E-ring is employed as the locking member, but it may be a C-ring, a screw-retained cylindrical ring, or any other comparable fitting for supporting and/or axially restraining the downward movement of the shaft.

What is claimed is:

1. An electric motor thrust bearing mechanism, comprising:
   (a) a bearing holder (7);
   (b) a bearing (8) held by said bearing holder;
   (c) a vertically oriented shaft (1) rotatably supported by said bearing;
   (d) a rotor yoke (2) mounted on one end of said shaft;
   (e) a rotor magnet (4) mounted on said yoke and confronting a stator (5, 6);
   (f) a locking member (20) mounted on said shaft above said bearing;
   (g) a first, upper thrust pad (21) engaged with said locking member for rotation therewith; and
   (h) a second, lower thrust pad disposed between said first thrust pad and said bearing, and having an outer periphery disposed in an annular groove formed in an upper end of said bearing holder;
   (i) said first and second upper and lower thrust pads being relatively rotatable as said shaft rotates and preventing any downward movement thereof.

2. A mechanism as claimed in claim 1, wherein said first and second upper and lower thrust pads are made of a low friction, wear resistant resin.

3. A mechanism as claimed in claims 1 or 2, wherein said locking member is an E-ring fitted in an annular groove (1a) of said shaft.

4. A mechanism as claimed in claim 1, wherein said first and second upper and lower thrust pads are made of metal coated with a low friction, wear resistant resin.

5. An electric motor thrust bearing mechanism, comprising:
   (a) a bearing holder (7);
   (b) a bearing (8) held by said bearing holder;
   (c) a vertically oriented shaft (1) rotatably supported by said bearing;
   (d) a rotor yoke (2) mounted on one end of said shaft;
   (e) a rotor magnet (4) mounted on said yoke and confronting a stator (5, 6);

(f) a locking member (20) mounted on said shaft above said bearing;
(g) a first, upper thrust pad (21) engaged with said locking member for rotation therewith; and
(h) a second, lower thrust pad (22) disposed between said first thrust pad and said bearing,
(i) said first upper and second upper thrust pads being relatively rotatable as said shaft rotates and preventing any downward movement thereof, wherein said locking member is an E-ring fitted in an annular groove (1a) of said shaft, and further wherein the first and second thrust pads are configured as rings, and the first upper thrust pad has an upstanding projection seated in an opening of the E-ring.

6. A mechanism as claimed in claim 5, wherein the second upper and lower thrust pad seats in an annular groove in an upper face of the bearing holder.

7. An electric motor thrust bearing mechanism, comprising:
(a) a bearing holder (7);
(b) a bearing (8) held by said bearing holder;
(c) a vertically oriented shaft (1) rotatably supported by said bearing;
(d) a rotor yoke (2) mounted on one end of said shaft;
(e) a rotor magnet (4) mounted on said yoke and confronting a stator (5, 6);
(f) a locking member (20) mounted on said shaft above said bearing;
(g) a thrust pad (21), said thrust pad having an engagement portion for engaging said locking member for rotation therewith; and
(h) said thrust pad preventing any downward movement of said shaft.

8. A mechanism as claimed in claim 7, wherein said engagement portion is an upstanding projection (21a) provided on said thrust pad.

* * * * *